(12) United States Patent
Ma (10) Patent No.: US 6,976,075 B2
(45) Date of Patent: Dec. 13, 2005

(54) SYSTEM USES COMMUNICATION INTERFACE FOR CONFIGURING A SIMPLIFIED SINGLE HEADER PACKET RECEIVED FROM A PDA INTO MULTIPLE HEADERS PACKET BEFORE TRANSMITTING TO DESTINATION DEVICE

(75) Inventor: David Yin-Shur Ma, San Jose, CA (US)

(73) Assignee: Clarinet Systems, Inc., Fremont, CA (US)

( * ) Notice: Subject to any disclaimer, the term of this patent is extended or adjusted under 35 U.S.C. 154(b) by 896 days.

(21) Appl. No.: 09/733,312

(22) Filed: Dec. 8, 2000

(65) Prior Publication Data

US 2002/0073234 A1    Jun. 13, 2002

(51) Int. Cl.[7] .............................................. G06F 15/16
(52) U.S. Cl. .................... 709/228; 709/227; 709/230; 709/246
(58) Field of Search ............................ 709/246, 224, 709/227, 247, 219, 200, 228, 230, 245; 455/566, 455/426.1, 405, 466; 370/338, 349, 252, 370/312, 401; 710/37

(56) References Cited

U.S. PATENT DOCUMENTS

| | | | |
|---|---|---|---|
| 5,673,322 A * | 9/1997 | Pepe et al. ..................... 705/52 |
| 5,727,159 A * | 3/1998 | Kikinis ........................ 709/246 |
| 5,938,737 A * | 8/1999 | Smallcomb et al. ......... 709/247 |
| 6,115,384 A * | 9/2000 | Parzych ....................... 370/401 |
| 6,405,037 B1 * | 6/2002 | Rossmann ................ 455/426.1 |
| 6,453,371 B1 * | 9/2002 | Hampson et al. ............. 710/37 |
| 6,526,034 B1 * | 2/2003 | Gorsuch ...................... 370/338 |
| 6,597,903 B1 * | 7/2003 | Dahm et al. ................ 455/405 |
| 6,608,818 B1 * | 8/2003 | Abrol et al. ................ 370/252 |
| 6,633,910 B1 * | 10/2003 | Rajan et al. ................ 709/224 |
| 6,681,252 B1 * | 1/2004 | Schuster et al. ............ 709/227 |
| 6,684,087 B1 * | 1/2004 | Yu et al. ..................... 455/566 |
| 6,704,031 B1 * | 3/2004 | Kimball et al. ............. 345/745 |
| 6,714,794 B1 * | 3/2004 | O'Carroll .................... 455/466 |
| 6,717,925 B1 * | 4/2004 | Leppisaari et al. ......... 370/312 |
| 2002/0049833 A1 * | 4/2002 | Kikinis ........................ 709/219 |
| 2002/0065868 A1 * | 5/2002 | Lunsford et al. ........... 709/200 |
| 2002/0101848 A1 * | 8/2002 | Lee et al. .................... 370/349 |

* cited by examiner

*Primary Examiner*—Le Hien Luu
(74) *Attorney, Agent, or Firm*—Stevens Law Group P.C.

(57) ABSTRACT

The invention provides a communication interface that is configured to exchange digital data packets configured with a simplified header format with a PDA, and is further configured to exchange digital data configured with a conventional header format with a device such as a computer server communicating with a network, such as the Internet. When directed to exchange data between a PDA and a computer, the interface is capable of converting the header of a data packet from one header format to another header format. This allows seamless communication between the computer and the PDA.

30 Claims, 8 Drawing Sheets

Prior Art Packet 500

PPP Header 4 bytes
502

TCP Header 20 bytes
(4 bytes if compressed)
504

IP Header 20 bytes
506

Data 1460 bytes
(1476 if TCP Header compressed)
(1760 if PPP encoding used)
508

FIG. 5

**Simplified Packet
According to Invention 500**

| Data ID Header 4 bytes
602 |
| Data 1496 bytes
604 |

SYSTEM USES COMMUNICATION INTERFACE FOR CONFIGURING A SIMPLIFIED SINGLE HEADER PACKET RECEIVED FROM A PDA INTO MULTIPLE HEADERS PACKET BEFORE TRANSMITTING TO DESTINATION DEVICE

BACKGROUND

The invention relates generally to communication with a personal data assistant (PDA) and, more particularly, to a method and apparatus for communicating between a PDA and computer.

A PDA is generally a portable device configured to store data and perform basic functions for a user to view, receive, transmit, store and consume data. Different types of PDAs are well known in the consumer electronics industry and are currently in widespread use. One popular device is the Palm Pilot™, made by Palm™. This device runs on a specialized operating system, known as PalmOS™. Other PDAs may be configured under different operating systems, such as the WindowsCE™ and the PocketPC™ that run under operating systems that are developed and sold by Microsoft Corporation™. These PDAs may offer internal software applications such as an address book for keeping names and addresses, a calendar for keeping schedules and important dates, a notebook for keeping notes, an Internet application for accessing the Internet to send and receive E-mail and other services, specialized applications for communicating with computer servers over a network and other applications.

Most conventional PDAs include the ability to communicate with a computer system via a network, such as an Ethernet. One method of performing such communication is to dial up a connection with a computer server that is connected to network via an infrared access point connected to a local area network (LAN). Such a connection is known as a LAN access point, or LAP. The protocol used to communicate with the server is known as the TCP/IP/PPP protocol. This is a protocol commonly used in the industry of data communications. This protocol requires a great deal of computer processing power in order to perform a data transfer. As a result, the transfer of data between the server and the PDA is cumbersome and slow.

To illustrate a practical application that utilizes a PDA, a restaurant may have its waiters use a PDA to take orders from customers and transmit the orders to the kitchen. A preparation cook can then view the orders on a computer screen, saving the waiter a trip to the kitchen to submit the order. Data may also be sent to other locations such as the cashier for producing a bill, a stock manager for tracking inventory, and other locations that may be helpful to the business.

Using a conventional system, the PDA application would typically open up a TCP connection with the remote computer by specifying the computer's Internet Protocol (IP) address or other identification. Requiring the PDA to know the computer's IP address is burdensome on the PDA and, more importantly, requires the PDA to either contain a large amount of IP addresses or to be reconfigured for every computer to which the user of the PDA wishes to communicate. The operating system of the PDA then opens up a PPP connection using a communication configuration, such as a LAP, or, more specifically, an infrared modem.

The communication operation requires a TCP/IP/PPP protocol data stack stored in the operating system of the PDA. This stack enables the PDA to generate data packets having TCP/IP/PPP headers associated with each packet. Such a header is standard protocol for communication between computers when interacting and sending data from one computer to another. The identification header of the TCP IP is typically 40 bytes of data for every data packet that is transmitted. The IP header is usually 20 bytes in size, and the TCP header is 20 bytes, totaling 40 bytes. In some configurations where compression of the TCP header is used, the TCP's 20 bytes may be reduced to 4 bytes, leaving a header with a total of 24 extra bytes required for each data packet transfer. If PPP protocol is used for encoding, there are 4 extra bytes to add to the header, giving 44 bytes in the standard header, or 28 bytes in a header with a compressed TCP. This requires the use of the PDA's memory capacity, which may be a large burden on the PDA, especially since PDAs are typically small hand held devices. This burden is also a bit unreasonable, since the interaction between the PDA and the computer is typically not an interaction using reciprocal dialog, but merely an operation of uploading and downloading data packets.

Moreover, the protocol lays a tremendous burden on the microprocessor within the PDA, which is typically a small, specialized microprocessor, designed to perform particular tasks. In particular, the AHDLC encoding procedure and the CRC checksum procedure are a large burden on the PDA's microprocessor. Such burdens lessen the ability of a PDA designer to keep the PDA device small, yet still have adequate processing power.

If the AHDLC encoding is used, a PPP header is required. The PPP connection is made by negotiating a communication protocol and channel between the PDA and the computer via the LAP. The PPP header, typically 4 bytes in size, requires an encoding operation to be made to each byte of the entire block of data to be sent. The reason for the PPP connection is that, in conventional communication protocols, bytes 00 hex through 20 hex must be encoded. The reason for this is that, historically, these bytes were used in serial telephone modem communications for control bytes, leaving them unavailable for use as data bytes. So, for example, for every 256 bytes used, 32 of those bytes are not available for use and must be encoded if they are to be used as data. Encoding the bytes differentiates them from the 00 through 20 bytes that may be used for control instructions.

For example, if 1500 byte data packets are to be sent, including the TCP and IP header, the time needed to perform the PPP connection for each data packet transmission is $t=[f(x)\times 1500]$, where $f(x)$ is the encoding operation. The result of this operation is an extra byte for every byte encoded, giving 3,000 bytes that need to be that need to be operated on. Since 32 of the 256 Hex bytes must be encoded, the extra bytes generated would be approximately $[32/256\times 1500\times 2]=300$. This extra data is a burden on the device memory, requiring more memory space to store the data. It is also a burden on the processor, which must spend the extra time to encode the data, byte by byte, in order to transmit the entire data block. The resulting amount of data is 1500+300=1800 bytes to be transferred from the PDA to the computer or other device.

The CRC checksum operation, part of an error check procedure between devices, also requires a mathematical operation to be performed on each byte of the data packet being sent. For example, if 1500 bytes are to be sent in a packet, 40 bytes make up the TCP and IP header together, leaving 1460 bytes of data to be sent. To send this packet, a mathematical operation must be performed on each byte. This operation may be an add operation, where all of the bytes are added together, or some other operation, $f(x)$, which may depend on the application. The time required for such an operation would be t= [f(x)×1460]. This could be a large burden on the microprocessor, greatly slowing down the data transfer process.

As a result, the extra burden of the TCP/IP/PPP protocol causes the PDA to be slow to process, transmit and receive data, and requires large memory storage and processing components, increasing the size and weight of the PDA.

After the PPP negotiation and connection set-up with the connection is complete, the PDA is assigned an IP address. The PDA can then open a TCP connection with the computer. Referring again to the restaurant application, once the TCP connection is opened, the food order is sent to the computer for processing. Once the order transmission to the computer is complete, the communication connection is deconstructed. In order for the waiter to send another order, a new communication connection must be established, and the process is done again.

Therefore, it would be useful to develop a device and method for more efficiently transferring data between a PDA and a computer server that is less burdensome on the digital memory storage and the data processor of the PDA. As will be seen, the invention provides such a device and method that accomplishes these goals in an elegant manner.

SUMMARY OF THE INVENTION

The invention provides a communication interface that is configured to exchange digital data packets configured with a simplified header format with a PDA, and is further configured to exchange digital data configured with a conventional header format with a device such as a computer server communicating with a network, such as the Internet. When directed to exchange data between a PDA and a computer, the interface is capable of converting the header of a data packet from one header format to another header format. This allows seamless communication between the computer and the PDA. The typical communication between the PDA and other devices is not interactive, but rather relatively simple data downloads and uploads. Therefore, complex header protocols required for universal communication with other devices, including devices connected to the Internet, are not necessary for a PDA. Using the interface, the complex computations and extensive data storage required to make data transactions can be offloaded from the PDA to the interface. The interface can then perform the direct communication with a computer server or other device that is connected to a network, such as the Internet. In operation, the communication interface may receive the data packet transmitted from the PDA under the first header format, destined for a computer connected to a network such as the Internet, and convert the header associated with the data packet to the second header format. The interface can then transmit the data packet having the reformatted header to the computer server via the network for processing.

Similarly, the communication interface is further configured to receive the data packet having the second header format and transmitted from the computer server, convert the associated header from the second header format to the first header format and then transmit the data packet having the reformatted header to the PDA. The inclusion of such a communication interface in a computer system reduces the amount of overhead data required to send data to and from the PDA. Employing the interface also reduces the amount of computation required of the PDA to receive and transmit the data. The invention may be extended to include the execution of other complex operations for the PDA for which the PDA may not have the memory or processing capacity.

DETAILED DESCRIPTION

The invention provides communication interface for enabling communicating between a personal data assistant (PDA) and a device connected to a network such as computer server. Typical communication between the PDA and other devices is not interactive, but rather relatively simple downloads and uploads of data packets. Therefore, according to the invention, complex header protocols required for universal communication with other devices, including devices that communicate via the Internet, are not necessary. To this end, a communication interface is provided for performing the complex header protocols for the PDA, with the communication interface acting as an interface between the PDA and other conventional devices. The communication interface may have an IP address associated with the PDA so that it may send and receive transmissions of data on its behalf. This way, any device connected to the Internet can send the PDA data. The interface may then intercept such data transmissions and process them according to the invention. Thus, the PDA may operate entirely transparent to the devices that transmit data packets to it.

The use of a simplified header format for transferring and receiving data packets and a system that can communicate using the simplified format is provided. The simplified header may simply have basic information pertaining to the data being sent, such as size, sequence of data if transferred among a number of packets, destination address, identification of the communication interface, or different combinations and permutations of such information. A packet may be sent with simply a destination address and accompanying data. In using the simplified format, less memory capacity is required of the PDA as well as less processing capacity to prepare and send the data packets. The interface may be configured to communicate with PDA by receiving data from the PDA and sending data to the PDA under a simplified header format, the simplified format being simplified relative to conventional TCP/IP/PPP header format. The interface may include a storage device for storing data and a wireless data transceiver for receiving data packets from and transmitting data packets to the PDA, where the data packets are configured under the simplified format. Accordingly, the PDA may include a similar transceiver configured to receive data packets from and transmit data packets to the interface.

According to the invention, the interface may also be configured to communicate with a device connected to a network, such as a computer server, that is configured to send, receive and process data formatted under a second header format that may be different than the simplified format. The interface may act as a central header translator that is configured to receive digital data to and from the PDA configured under a first header format, then translate the first header format to a second header format. The interface may then send the data configured under a second header format to the computer server. In operation, the device may receive the data transmitted to it by the PDA and convert it from the first header format to the second header format. The device may then transmit the reformatted data packet to the computer server for processing. The device may then receive the processed data transmitted from the computer server, convert the data packet back to the first header format, then transmit the again reformatted data packet back to the PDA.

The invention may include the utilization of dedicated processors, webservers configured to receive and route browser requests, application servers, state servers and other types of computer processors. These devices may be configured to communicate amongst each other and may be connected to one or more networks, including a Local Area Network (LAN), an intranet and the Internet. These networks may also include the use of wireless as well as wire line connections in order to communicate. However, it will be appreciated by those skilled in the art that such implementations of devices and systems are but few illustrations of the utility of the invention, and that the invention may have greater applicability and utility in many other applications where efficient routing and processing of data within one or more networks is involved. Equivalent structures embodying the invention could be configured for such applications without diverting from the spirit and scope of the invention. Although the embodiments described and illustrated herein are in the context of devices and systems for exchanging data among users of a computer system or network and users of PDAs, the invention extends to other applications where similar features are useful. The invention may include personal computers, application servers, state servers or Internet webservers that are designed and implemented on a computer and may be connected to a network for communication with other computers to practice the invention. A system configured to operate according to the invention may include a plurality of personal computers and PDAs connected to the Internet via individual modems or other communication means such as wireless communications.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. In devices such as PDAs, it is important that processors are physically small enough to help keep the PDA itself small, yet powerful enough to be able to perform the tasks required to make the PDA useful for sending, receiving and using data. It is these goals that a device embodying the invention may achieve.

The software code utilized in the PDAs and other devices utilizing the invention may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of devices, such as specialized computer servers and PDAs, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, nor any commonly used protocol for storing and retrieving information to and from these memory devices respectively. In devices such as PDAs, it is important that such memory devices are physically small enough to help keep the PDA itself small, yet contain enough storage space required to make the PDA useful for sending, receiving and using data. It is these goals that a device embodying the invention may achieve.

Figure 1:
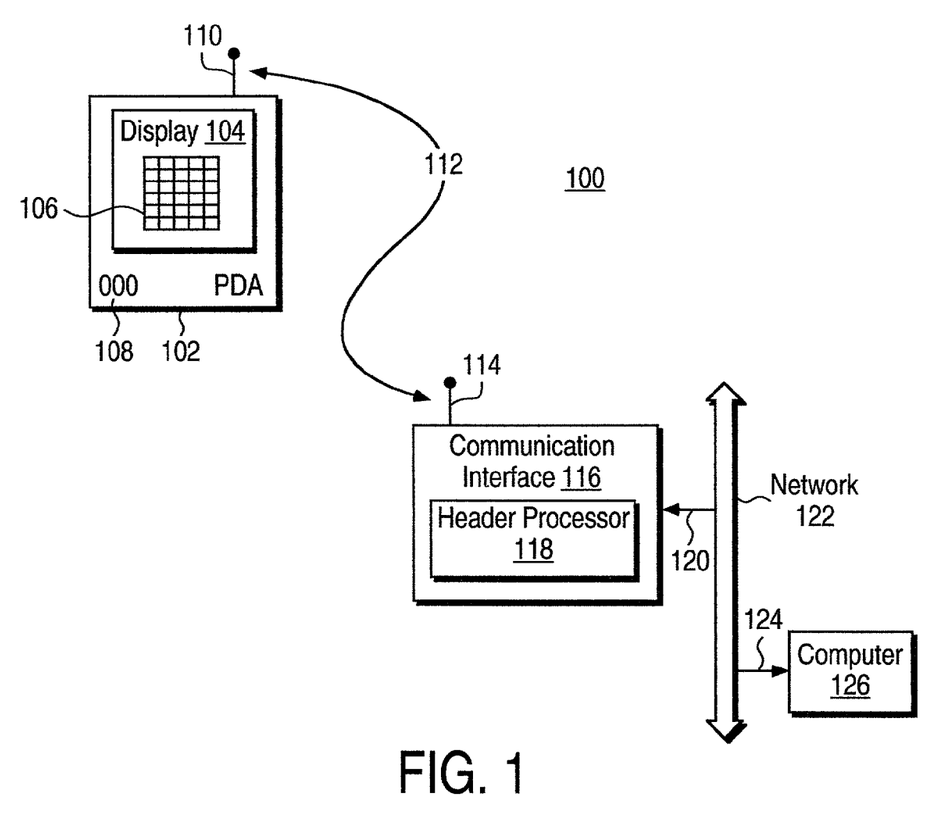
FIG. 1 is a block diagram of a system for communicating between a PDA and a computer according to the invention.

Referring to FIG. 1, a block diagram of a system having a device configured to enable communication between a PDA and a device connected to a network according to the invention is illustrated, in this embodiment a computer server connected to a network such as the Internet. The PDA 102 includes graphical user interface (GUI) 104 for displaying content 106 to a user. The PDA may also include manual control switches or knobs 108 for inputting data into the PDA, but may also be configured with a touch-sensitive screen or other type of data input mechanism for inputting data into the PDA. The PDA may also include means for transmitting and receiving data such as an antenna 110 connected to a transceiver (not shown in FIG. 1). Such an antenna may be internal to the device, not visible to a user during normal use. The transceiver may operate as a laser light device, a radio frequency (RF) device, or other type of communication mechanism configured to send and receive data between the PDA and some destination. The primary purpose of such a device is to provide a portable hand-held device for sending and receiving data between the PDA and another remote device.

The PDA may be configured to communicate via a signal 112 with a similar transceiver connected to an antenna 114, which is connected to communication interface 116. The interface transceiver may be configured to operate in the same manner as the PDA's transceiver. One purpose of the communication device is to provide a mechanism for enabling efficient and improved communication between the PDA and another device. This is accomplished by reducing the amount of data sent by and received from the PDA as well as the computations required for such data transactions in the normal use and operation of the PDA. The communication interface may include a header processor 118 that is configured to manage header information that is transmitted between the PDA and the communication interface. One way that it may accomplish this is by reducing the amount of header data that is typically transferred to the PDA by reformatting and simplifying the conventional TCP/IP/PPP header to a smaller, efficient and more manageable header. This obviates the PDA's need to process and store the conventional header. The communication interface may also be configured to receive data that is transferred from the PDA in this simplified format, reducing the amount of header data transmitted by the PDA. As a result, this also reduces the amount of processing required by the PDA to transmit such data, such as the processing that is typically required to transmit data using conventional headers. This is described in more detail below. The common format for conventional data communications with PDAs is the TCP/IP/PPP protocol. When communicating between a PDA and a computer, the TCP/IP/PPP protocol is typically used. When communicating between a computer and other conventional devices, a TCP/IP is typically be used. Other standard data formats configured for universal communication may be used, but would not depart from the spirit and scope of the invention. This conversion may involve the conventional communication operations discussed above. One of the advantages of the invention over the prior art, however, is that these operations can be performed by a communication interface rather than the PDA, relieving it of this burden.

Still referring to FIG. 1, the communication interface 116 may be configured to communicate through a communication channel 120 with a network 122. The communication channel may be a telephone landline, an Ethernet connection, or any number of communication mechanisms, whether constructed with electronic hardware or some type of wireless application. The Network may be a LAN, an intranet, the Internet, or some other type of mechanism that allows computers and other data processing devices to communicate amongst themselves. The network may also communicate via a second communication channel 124 with a computer 126. This allows a means for the communication interface to communicate with the computer.

In operation, the PDA 102 may process data, convert the data into a signal 112 and transmit the signal to the communication device 116. The data is sent in separate packets, which may be of uniform or varying size. These packets may include a header having a predetermined format that is a specialized format configured to optimize the data transfer. The communication device may then convert the header format of the received data to a conventional TCP/IP header. This allows the data to be transferred along conventional channels, such as the network 122, to conventional devices, such as computer 126. The computer can then process the data and then return it along the reverse path back to the PDA.

This system optimizes the operation of the PDA in several steps. One step is the transfer of data from the PDA to the communication interface. As discussed in the background, conventional devices communicate using the conventional protocol, which requires a large amount of processing prior to transmitting data. This processing also generates more data that must be transmitted along with the large header as well as the actual data. The communication interface takes this burden off of the PDA by converting the simplified header to a formal conventional TCP/IP or other header. The data can then be processed or sent to other devices in remote locations, such as the computer 126. At this location, the computer is able to perform complex operations on the data that may be overly burdensome for the PDA. For example, a user of a PDA may want financial projections on a transaction. The user could send the basic information to the computer via the communication interface. The computer, having extensive processing power, could perform the complex operations and then transmit the result data back to the PDA via the communication interface for use by the PDA's user. According to the invention, these new features provided by the system effectively give virtually limitless remote processing power to the PDA, and actually reduce the processing and data storage burden on the PDA at the same time.

Figure 2:
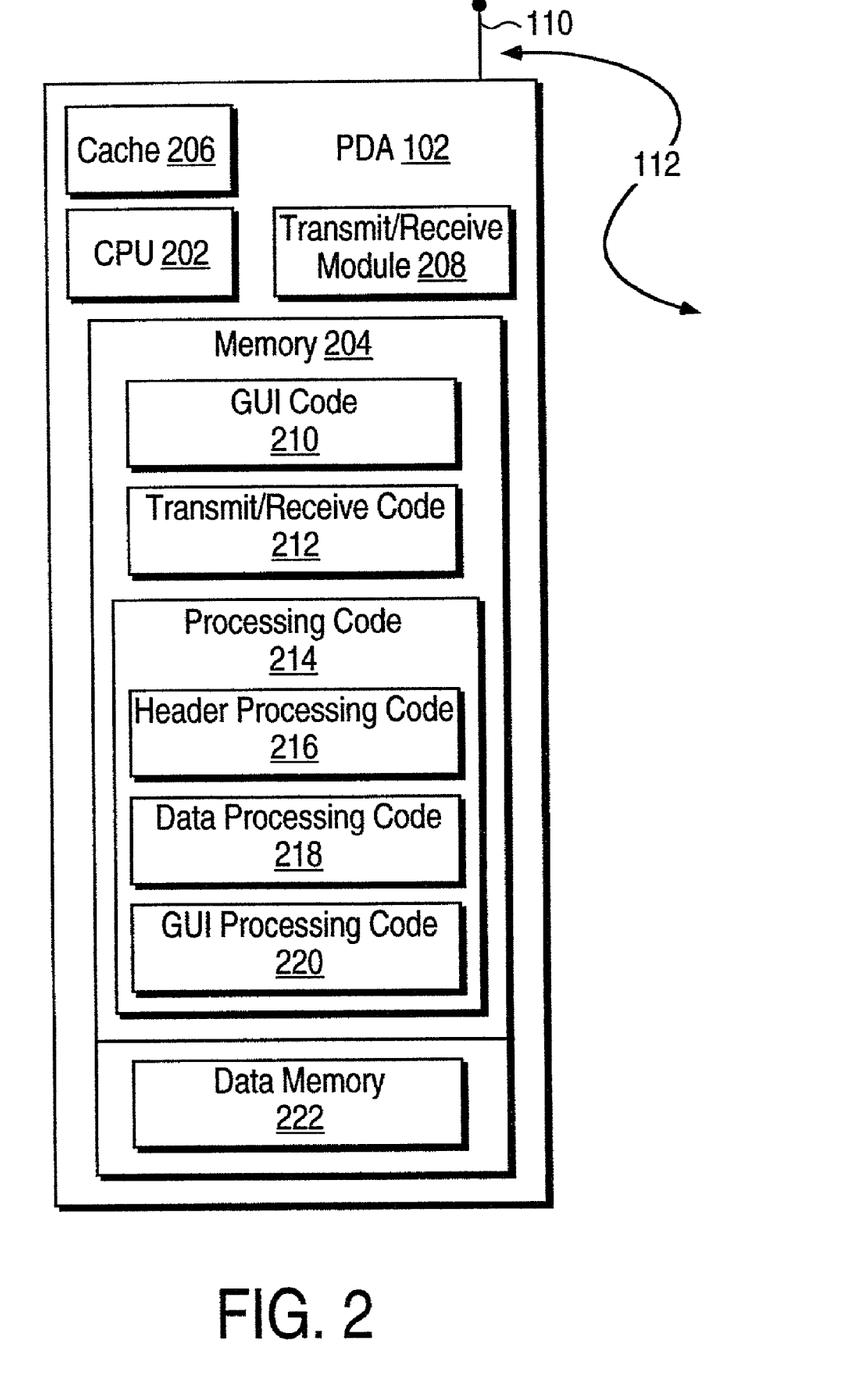
FIG. 2 is a block diagram of a PDA configured to operate according to the invention.

In order to understand the operation of the invention, it is useful to understand the components in more detail. Referring first to FIG. 2, a more detailed illustration of a PDA 102 is shown. The PDA typically includes a central processing unit (CPU) 202 that is configured to execute software commands and perform PDA functions according to the command instructions that may be received from an outside source. These commands may be stored in main memory 204 or cache memory 206. Such functions may include the transmission and reception of data, graphical user interface operations, data processing operations, data security functions, and other functions that may be related to the operation and use of a PDA. The PDA typically includes some type of transmit/receive module 208, which may be a transceiver that performs both sending and receiving operations, or separate components for transmitting and receiving data. The module may be connected to an antenna 110 for sending and receiving electronic signals 112.

The PDA may include a main memory 204 having software code and data stored therein. The software code may be executed by the CPU 202, and may govern the operations and functions of the PDA. The PDA may also include cache memory 206 for storing data frequently used by the CPU. In some applications, the PDA may be configured to store software from the main memory into the cache memory in order to give the CPU easier access to the data for execution. Graphical user interface code 210 may be executed by the CPU to control the PDA's display 104 (FIG. 1). The code used would likely be unique to the application used for the graphical display, such as a light emitting diode (LED) display, a quartz display, or other type of display. Many types and implementations of displays are well known to those skilled in the art of PDA design as well as other similar technologies. Transmit and receive code 212 may also be included in the PDA main memory. Upon execution by the CPU, the transmit and receive code enables the CPU to cause the PDA to transmit and receive data with the transmit and receive module 208. The memory may further include processing code 214 for processing instructions and data related to processing headers, data, GUI instructions and data, and other instructions.

The processing code may include header processing code 216 configured to change headers among different formats according to the invention. As discussed above, the invention provides a method and apparatus for optimized transmission of data between the PDA and a communication interface. The PDA simply sends data packets having reduced headers in order to reduce the computation needed to prepare and send the data. The data is simply sent with minimal information. The header information may include the IP addresses of the PDA and the destination device for identifying the source and destination of the information. The header may also include the file name, the file size, the sequence of the data packet in relation to other data that has been sent, and other information related to the data, of different combinations and permutations of such information. Of course, the packet may also include the data itself, which may be referred to as payload data.

The header accompanying data within a packet may be configured according to a standard protocol such as the IrDA Object Exchange Standard, or IrOBEX, developed by the Infrared Data Association™, a copy of which is attached. The invention, however, is not limited this protocol, but extends to other configurations that allow a data packet to be configured with limited header information. Such a data packet may include the minimal amount of information that is required to transmit data from the PDA to the communication interface, such as the name of the file being transferred and the beginning and end of the data. Importantly though, according to the invention, the header used for transmission between the communications interface and the PDA is much more simple than complicated header information such as that required under the TCP/IP/PPP protocol data, which is commonly used in conventional data transmission applications. This simplified header saves much computation in the transmission of data from the PDA.

For example, in the data transmission operation between the PDA and the communication interface, a first packet may be sent that identifies the name and size of the data file to be transferred. A second packet may then be sent having a header that identifies what part of the whole file is being transferred and the size of the particular portion being transmitted within the second packet, specifying the beginning and the end of the portion being transferred. However many packets that are needed to transfer the data are transmitted until the entire file has been completely transferred. The final packet may then specify the end of the file, indicating that the entire packet has been transferred to the destination. The transmission of data in this manner may be done in both directions, from the PDA to the communications interface as well as from the communications interface to the PDA. In either case, the transmission of data is greatly simplified in order to lighten the processing load on the PDA. This method also reduces the amount of storage space is needed in the PDA and greatly reduces the transmission time of data transmissions. This also relieves the PDA from having to keep a TCP/IP/PPP protocol stack in its memory.

Still referring to FIG. 2, the PDA may also include data processing code 218 stored in its main memory 204 for performing the processing of data within the PDA when the CPU executes the code. According to the invention, many data processing functions may be performed remotely, sparing the PDA of the processing burden. This allows the PDA to run more efficiently and require less powerful processing circuitry. The PDA memory may also include GUI processing code for performing general GUI functions when executed by the CPU. The main memory may also include data memory for storing data to be used or transmitted by the PDA.

Figure 3:
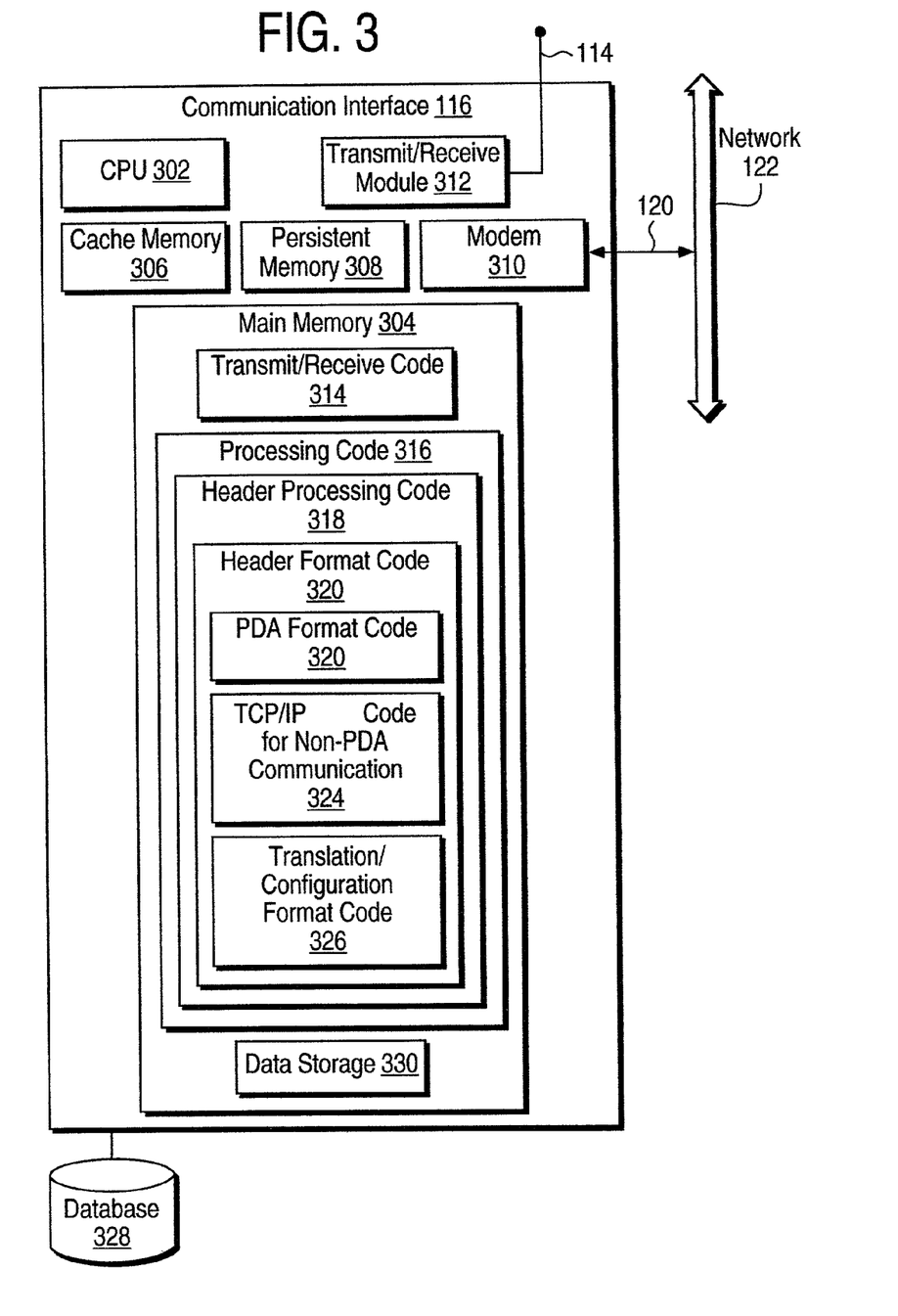
FIG. 3 is a block diagram of a communications interface according to the invention.

Referring to FIG. 3, further details of the communications interface 116 are shown. The interface may include a CPU 302 configured to execute software code stored in main memory 304 for performing internal operations of the interface. Optional cache memory 306 and persistent memory 308 may also be included in the interface to provide alternative storage locations to optimize access to data by the CPU. The interface may also include modem 310 that allows the interface to communicate with network 122 via communication link 120 as discussed above. This enables communication with other devices on the network such as computer 126 of FIG. 1. Transmit and receive module 312 may also be included for facilitating communication between the interface and the PDA, and the module may be connected to antenna 114. The module may be a transceiver, performing both transmit and receive functions, or the two functions may be divided into two separate modules. The transmission module may be a radio frequency module, configured to send and receive RF signals. The module may also be an infrared LAN (local area network) access point (LAP) for receiving and sending infrared signals when communicating with a similarly equipped and configured PDA. The invention is not limited to a particular type of interface between the PDA and the communication interface.

The interface includes a main memory 304 for providing main storage of data and software code required for the operation of the interface. Transmit code 314 may be included to allow the interface to perform transmit and receive functions when the code is executed by the CPU. According to the invention, the code can be designed to configure the interface to sent and transmit data having a simplified header, without any TCP/IP/PPP headers, with similarly configured PDAs.

The interface may also include processing code 316, which, according to the invention, configures the CPU to perform data processing and instruction execution when the CPU executes the code. The code may include header processing code 318. The processing code includes executable software code for performing the header format configurations. These configurations may be used in facilitating communication between the PDA and the computer. Header format code 320 is configured to process headers of data packets by configuring them with the proper format according to the intended destination of the data packet.

For example, a data packet originating from the PDA and destined for the computer may have a simplified header as discussed above. The CPU may reconfigure this data packet when it executes the PDA format code 322. This code would allow the CPU to separate the data from the header so that it can be reconfigured. The translation and configuration format code 326 may then translate the header information pertaining to the data transmission from the simplified format to TCP/IP format. The reconfigured data packet can then be retransmitted to the computer using the transmit and receive code 314. If communicating with another PDA, the communication interface may retransmit a data packet with a simple header to another PDA. Or, if the packet is destined for other PDAs that are not so configured, it may transmit data using a TCP/IP/PPP header. This would make the communication device universally compatible with multiple communication devices.

Similarly, a data packet originating from a computer 126 and destined for the PDA 102 may have a header configured in the TCP/IP format. The TCP/IP code 324, when executed by the CPU, would allow the header to be separated from the data. The header can then be reformatted from the TCP/IP header format to the simplified format by executing the translation and configuration format code 326 with the CPU. The newly configured data packet can then be transmitted to the PDA whey the CPU executes the transmit and receive code 314.

Figure 4:
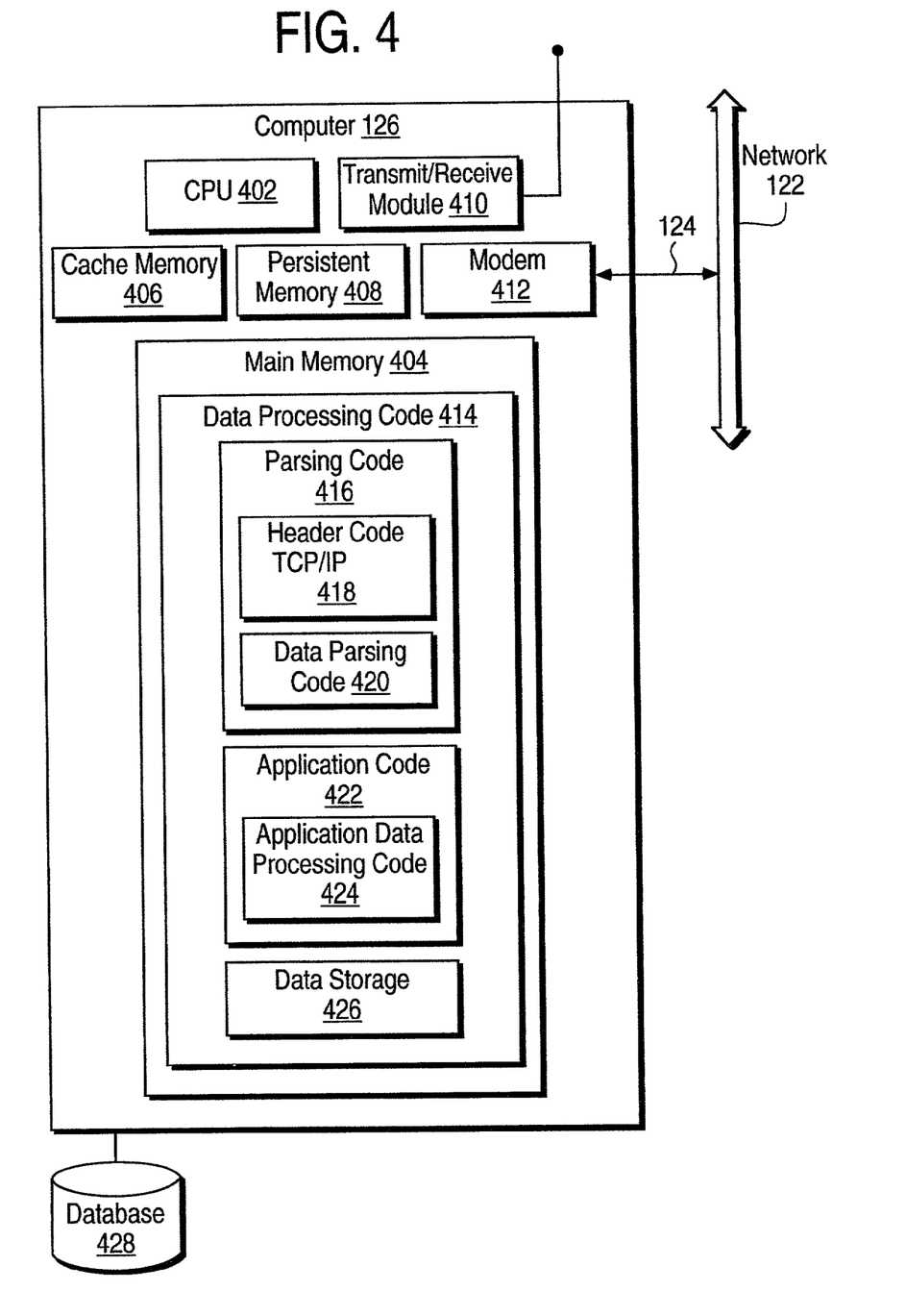
FIG. 4 is a block diagram of a computer configured to operate according to the invention.

The computer, 126, may be any type of data processing device such as a personal computer, wireless data communication device, or any other device that communicates by sending data packets configured with headers having TCP/IP format. According to the invention, a PDA is able to communicate with such computers via the communication interface without having to deal with TCP/IP and TCP/IP/PPP header format operations. Referring to FIG. 4, a more detailed block diagram of a computer is shown. The computer may include a CPU 402 configured to perform standard processing operations of the computer when it executes software stored in main memory 404. The computer may also include cache memory 406 and persistent memory 408 for providing more efficient access to data and command instructions to the CPU for execution.

In an alternative embodiment of the invention, the computer may include the functions of the communication interface 116. The computer would then include substantially all of the processing code 316 and transmit and receive code 314, FIG. 3. The computer would then need a transmit and receive module 410 for communicating with the PDA in the same manner as the communication device 116 does with its transmit and receive module 312. In such a configuration, the communication interface is built in to the computer, obviating the need for a separate device.

The computer may further include data processing code 414 that includes code that configures the CPU to perform data processing tasks. The code includes parsing code 416. The parsing code may cause the header to be parsed out from a data packet when the CPU executes the TCP/IP header code 418. Data may also be parsed out from a data packet by executing the data parsing code 420 with the CPU. Once the data is separated from the header, the computer may store the data in data storage 426 and process the data by executing the application data processing code of application code 422.

The application code may be code configured under any one of a number of applications wherein data may be used, processed or otherwise consumed. These applications may be used as remote operations to the PDA, giving it extra processing power that can be performed by the computer. For example, the user of a PDA may wish to attach and send a document or other large data attachment to an email for transmission via the Internet. The PDA being limited in size and, consequently, limited in memory and data processing capacity, it would be a large burden for it to have the document stored and processed in the PDA. According to the invention, in response to a request sent from the PDA, a document stored on the computer is capable of being attached to an email and transmitted to an email recipient. The capacity of the computer may be utilized in numerous ways to offer expanded memory and processing capacity to the PDA remotely. This capacity may also be provided to the PDA by the communication interface 116. The interface may be equipped in the same manner as the computer as described herein to provide remote processing and data storage functions.

The computer may also include a database 428 containing data for use by the computer 126. According to the invention, the PDA may be able to access the database attached to the computer by sending data packets containing instructions to do so. Using this technique, the PDA is able to perform processing and transmission of data that would normally be burdensome to the PDA performing these tasks by itself.

Figure 5:
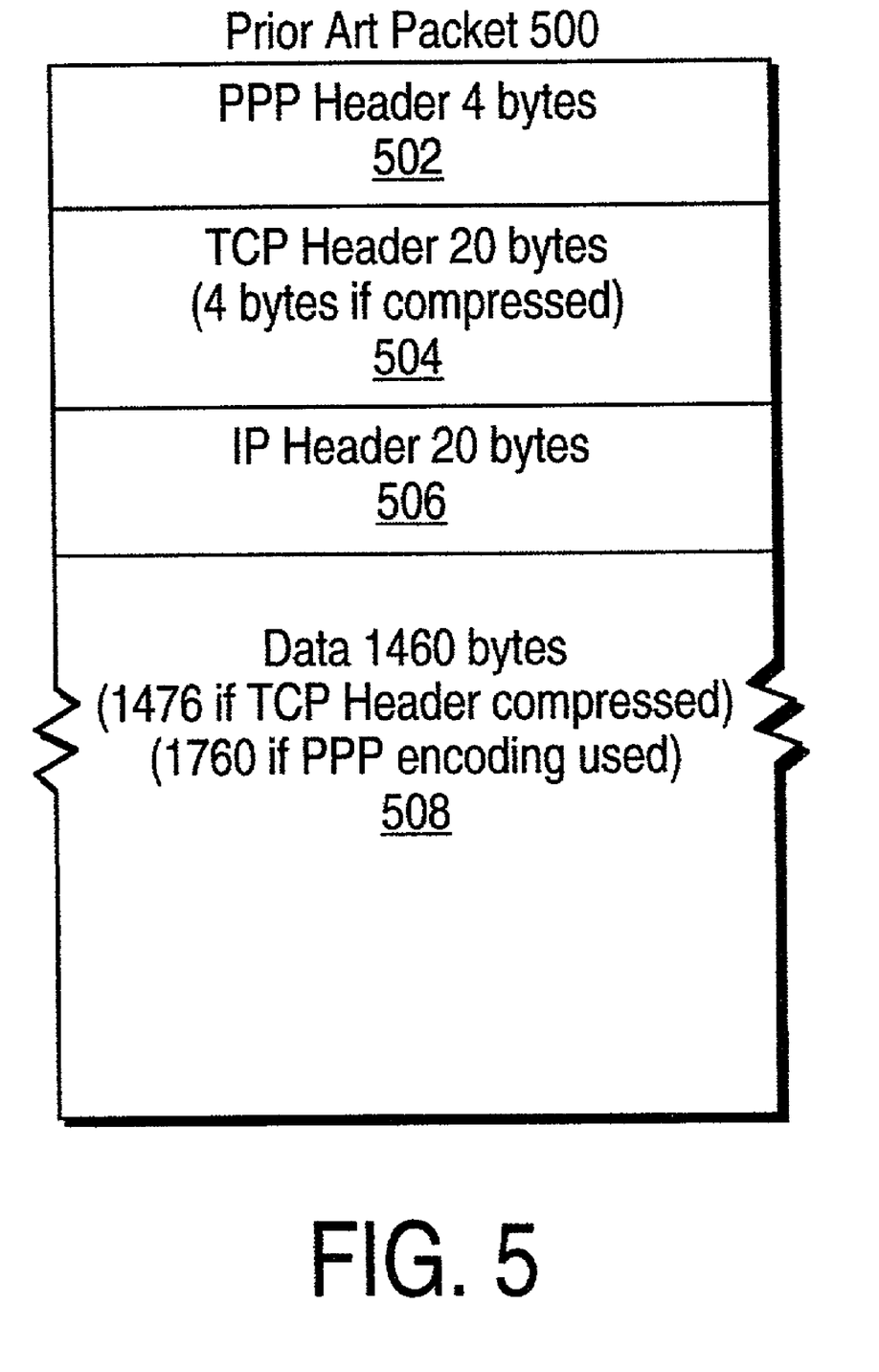
FIG. 5 is a block diagram of a conventional data packet used for data communication.
Figure 6:
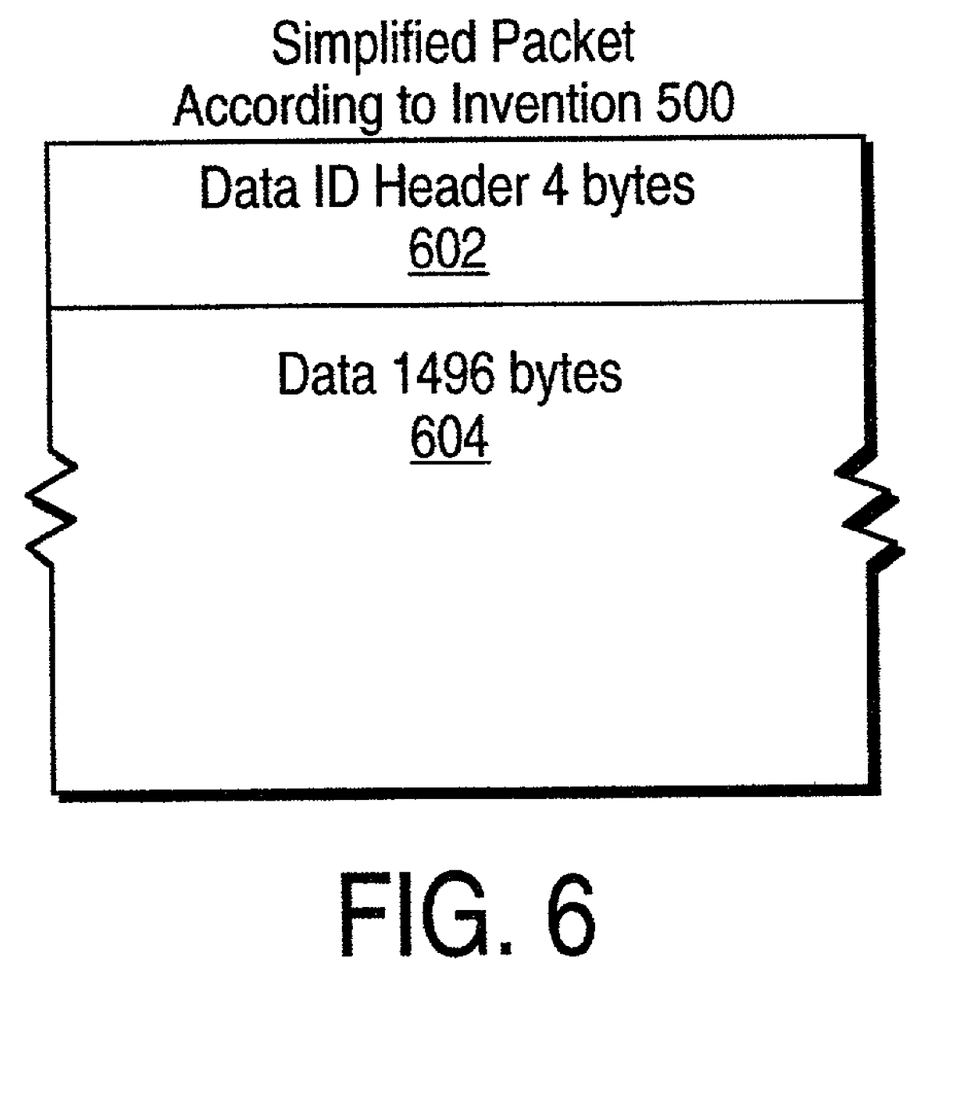
FIG. 6 is a block diagram of a simplified data packet used according to the invention.

In operation, the presence of the communication interface allows the PDA to greatly simplify data transmission as well as computations that are regularly performed by the PDA in normal use. According to the invention, the communication interface also greatly expands the PDA's capabilities without requiring any improvements in processing capacity or data storage capacity. Referring to FIG. 5, an example of a data packet used in the prior art is shown. As can be seen, transferring data at 1500 bytes for each packet can take up to 44 bytes of space from the packet for the header alone. The PPP header 502 takes up 4 bytes, the TCP header 504 takes up to 20 bytes (4 bytes if compressed), and the IP header takes up 20 bytes, for a total of up to 44 bytes. If PPP encoding is used, the data packet is increased by approximately 300 more bytes, which may be required to be transferred with the encoded data. As discussed in the background, this lays a heavy burden on the PDA. In contrast, the data ID header 602 in the simplified packet takes up much less memory space, as little as 4 bytes for a packet of 1500 bytes in this example. This leaves much more data, 1496 bytes of data 604.

In practice, an implementation of one embodiment of the invention included a PDA sending data using an OBEX formatted header, a header format that is much more simple than the TCP/IP/PPP protocol, to a communication interface. The implementation was tested, resulting in a data transfer of 5.5 kilobytes per second. This is an almost 300% improvement of an equivalent data transfer using TCP/IP/PPP headers in the data packets transmitted from and sent to the PDA. This result is an example of the utility of the invention in practical use.

Figure 7:
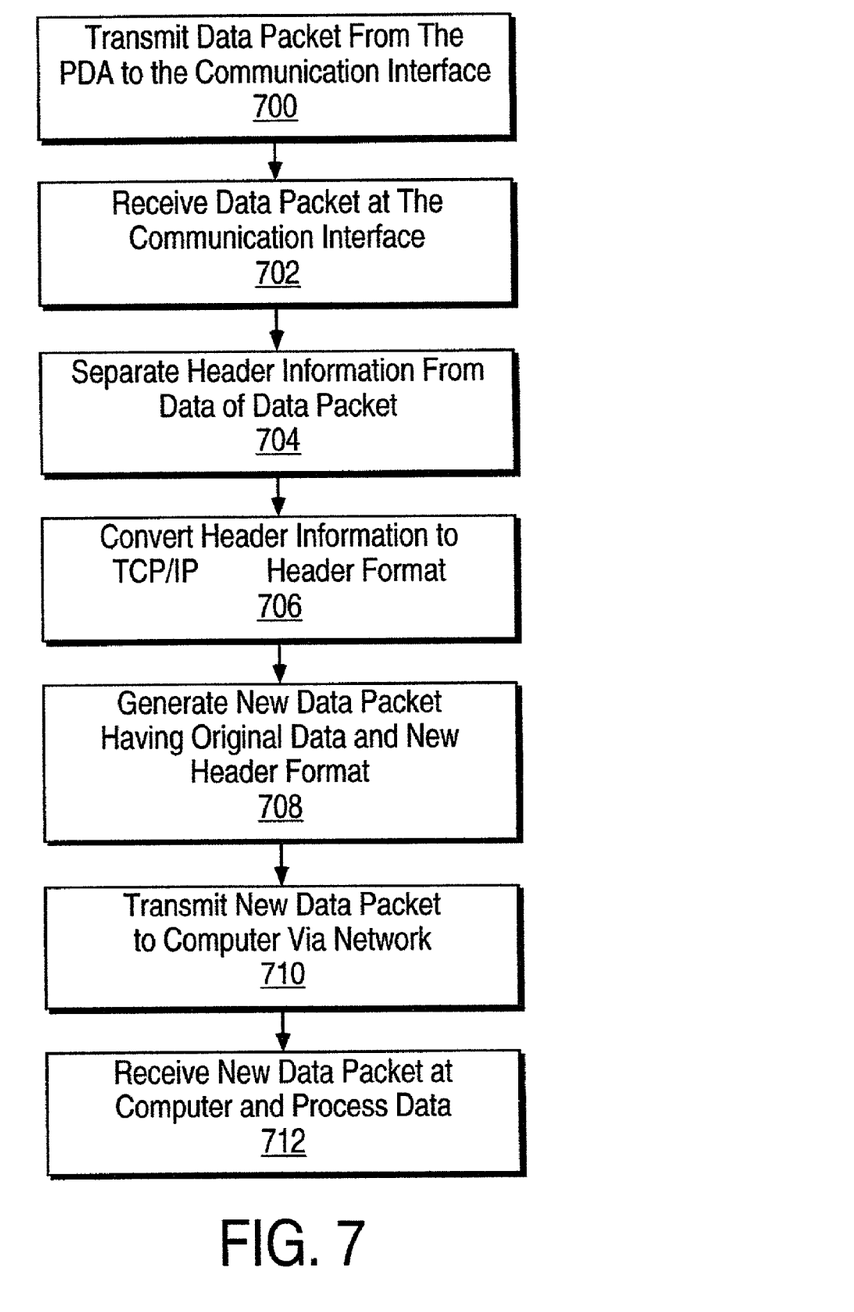
FIG. 7 is a flow chart of a process for transmitting data from a PDA to a computer according to the invention.

To better explain the operation of one embodiment of the invention, reference is made to FIGS. 7 and 8, which will now be explained. Referring first to FIG. 7, a transmission of a data packet from a PDA to a computer is illustrated. In the first step 700, a packet of data is transmitted from the PDA to the communication interface. The packet will have been formatted in a simplified format to simply identify the data size, the source of the data, the destination, the type of data, the number in a sequence of data packets if there are more than one, and other basic information required for the communication interface to identify and process the data packet. As discussed above, since this is a simple data download, complex header protocol, such as TCP/IP/PPP, that would require extensive processing by the PDA, is not required. Such complex header protocol may also cause the data to be transformed in the process, which would require undoing at the destination in order to further process or otherwise use the data.

In the next step 702, the data packet is received by the communication interface for processing of the header information. The first step in this procedure is to separate the header information from the data itself in step 704. Since same data is being sent to the computer, only the header information needs to be converted to a new format. The next step, step 706, is to convert the header information into the standard baseline communication format. As discussed above, the common format for data communications is the TCP/IP protocol. Other standard data formats configured for universal communication may be used, but would not depart from the spirit and scope of the invention. This conversion may involve the conventional communication operations discussed above. One of the advantages of the invention over the prior art, however, is that these operations can be performed by a communication interface rather than the PDA, relieving it of this burden. The interface may then generate a new data packet in step 708, again possibly performing conventional TPC/IP operations for formatting the header, encoding the data, etc.

The data packet may then be transmitted to the computer via the network in step 710. This is possible because the data packet at this point has a header configured under the standard communication protocol required for transmission over the Internet. All of this can be completely transparent to the computer. The computer may then receive the new data packet in step 712 and process the data contained therein. The computer may never be able to detect whether the data packet was sent by a PDA under a different header format or by another computer or other device that the computer may recognize. According to the invention, it never needs to know.

Figure 8:
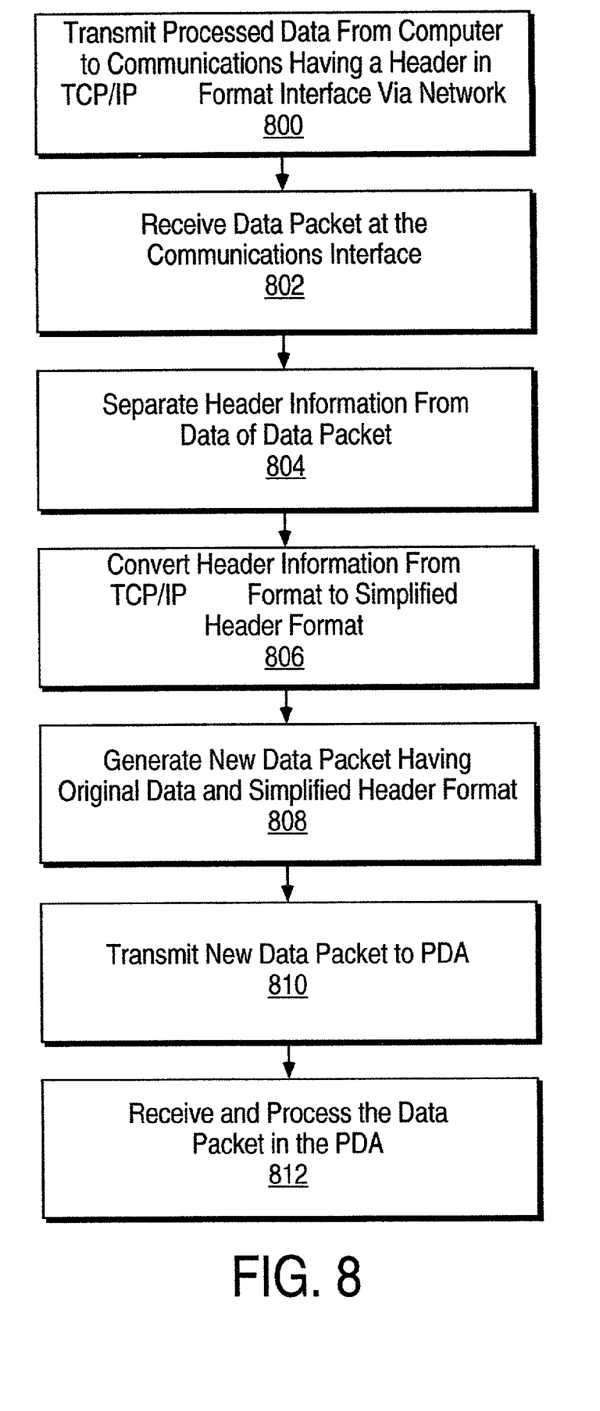
FIG. 8 is a flow chart of a process for transmitting data from a computer to a PDA according to the invention.

Referring now to FIG. 8, the procedure for transmitting data from the computer back to the PDA is illustrated. The process begins at step 800, where the data processed by the computer is transmitted to the communications interface via the network. This data packet may have a header configured under the TCP/IP protocol, so that it can be sent to the interface via the Internet. The communication interface may then receive the data packet in step 802. The communication interface may have an IP address associated with the PDA so that it may send and receive transmissions of data on its behalf. This way, any device connected to the Internet can send the PDA data. The interface may then intercept such data transmissions and process them according to the invention. The PDA may then operate entirely transparent to the devices sending it data packets.

The interface may then separate the header information from the data and convert the header in step 806 from the TCP/IP protocol to the simplified header as discussed above. The data can then be associated with the new simplified header in step 808 as the interface generates a new data packet. The interface can then transmit the new data packet to the PDA in step 810. The PDA can then receive and process the data packet in step 812, completing the process.

The invention is directed to a method and apparatus for efficiently exchanging data between a PDA and a conventional data processing device such as a computer server. In one embodiment, a communication interface is configured to exchange digital data configured with a first header format with a PDA. The communication interface is also configured to exchange digital data configured with a second header format with a device such as computer server. In operation, the communication interface may receive a data packet from the PDA and convert the associated header transmitted under the first header format to the second header format and then transmit the data having the reformatted header to the computer server for processing. Similarly, the communication interface is configured to also receive and convert data transmitted from the computer server with the second header format to the first header format and then transmits the data packet having the reformatted header to the PDA. The inclusion of such a communication interface in a computer system reduces the amount of overhead data required to send data to and from the PDA, and also reduces the amount of computation required of the PDA to receive and transmit the data. Another embodiment of this configuration also allows a PDA to utilize remote devices in order to extend its processing power. Although this embodiment is described and illustrated in the context of the use and operation of a PDA, the scope of the invention extends to other applications where convenient and efficient data transmission is desired. Furthermore, while the foregoing description has been with reference to particular embodiments of the invention, it will be appreciated that these are only illustrative of the invention and the changes may be made to those embodiments without departing from the principles of invention, the scope of which is defined by the appended claims.

What is claimed is:

1. A method of facilitating communication between a personal data assistant (PDA) and a computer server via a communication interface, comprising:
   receiving a data packet by a communication interface from a PDA, wherein the data packet is configured under a first format having a single identification header and includes a request to perform a process on the data packet;
   reformatting the data packet with the communication interface to a universal format having a plurality of headers indicating information including the identification of the data packet and destination of the data packet for transmission to other devices; and
   transmitting the reformatted data packet to a device.

2. A method according to claim 1 further comprising:
   receiving a data packet from the device;
   reformatting the data packet to a second data packer according to the first format; and
   transmitting the second data packet to the PDA.

3. A method according to claim 1 further comprising:
   performing a processing operation on the data packet with the device;
   receiving a data packet from the device;
   reformatting the data packet to a second data packet according to the first format; and
   transmitting the second data packet to the PDA.

4. A method of facilitating communication between a personal data assistant (PDA) and a computer server via a communication interface, comprising:
   receiving data packet by a communication interface from a PDA, wherein the data packet is configured under a first format having a singe identification header, related data and a request to perform a process on the data packet;
   reformatting the data packet to a single packet with the communication interface to a universal format having a plurality of headers including the identification of the data packet and destination of the data packet for transmission to other devices that are configured to receive the data packet; and
   transmitting the reformatted data packet to a device.

5. A method according to claim 4 further comprising:
   performing a processing operation on the data packet with a destination device;
   receiving a data packet configured according to the second protocol and having multiple headers from the destination device;
   reformatting the data packet to a second data packet according to the first format having a single identification header; and
   transmitting the second data packet having a single header to the PDA.

6. A method according to claim 4, further comprising receiving a plurality of separate data packets by a communication interface from a PDA, wherein each data packet is configured under a first format having a single identification header and related data and includes a request to perform a process on the data packet;

reformatting the data packets to a single packet with the communication interface to a universal format having a plurality of headers indicating information including the identification of the data packet and destination of the data packet for transmission to other devices; and transmitting the reformatted data packet to a device.

7. A method of facilitating communication between a personal data assistant (PDA) and a computer server via a communication interface, comprising:

receiving a data packet having a header configured under the OBEX protocol and having a single identification header and related data from a FDA to the communication interface;

configuring the header of the received data packet to a plurality of headers configured under the TCP/IP protocol with the communication interface and transmitting the reconfigured data packet having multiple headers to the computer server;

receiving a second data packet from the computer server, wherein the second data packet includes a plurality of headers configured under the TCP/IP protocol;

creating a third data packet by reconfiguring the header of the received packet under the OBEX protocol with the communication interface by generating a plurality of data packets that each have a single identification header and associating the single header with related data; and transmitting the third data packet to the PDA.

8. A system for communicating between a personal data assistant (PDA) and a computer comprising:

a PDA having a processor configured to process digital data configured under a first header format, a memory for storing data, a wireless data transmitter for transmitting data configured under the first header format to a remote location, and a receiver configured to receive data configured under the first header format from a source location;

a computer server configured to send, receive and process data formatted under a second header format; and a communication interface having a data processor that is configured to send and receive digital data configured under the first header format having a single header and related data to and from the PDA respectively, to send and receive digital data configured under the second header format having a plurality of headers to and from the computer server respectively, to receive and convert data transmitted under the first header format to the second header format and transmit the reformatted data to the computer server and to receive and convert data transmitted under the second header format to the first header format and transmit the reformatted data to the PDA.

9. A system according to claim 8 wherein the first header format is configured under an object exchange (OBEX) protocol, and wherein the second format is configured under a TCP/IP protocol, wherein the second header format includes a plurality of headers for identifying the data including the source and destination of the data packet, and wherein the first header format is configured with a single header having packet identification information and related data.

10. A system according to claim 8, wherein the PDA is configured to transmit data configured under the first header format from the PDA to the communication interface, wherein the communication interface is configured to reformat the received header with the second header format and to transmit the data packet with the new header to the computer server, wherein the communication interface is further configured to receive a second data packet sent by the computer server and reformat the header associated with the second data packet under the first protocol and to transmit the configured processed data to the PDA, and wherein the PDA is configured to receive and to process the configured processed data.

11. A system according to claim 8, wherein the PDA is configured to transmit data configured under the first header format from the PDA to the communication interface, wherein the communication interface is configured to configure the received header with the second header format and to transmit the data packet with the new header to the computer server, wherein the computer server is configured to process the received data and to transmit the processed data, which is configured under the second header format, to the communication interface, wherein the communication interface is configured to configure the header of the processed data under the first protocol and to transmit the configured processed data to the PDA, and wherein the PDA is configured to receive and to process the configured processed data.

12. A method of communicating between a personal data assistant (PDA) and a computer server via a communication interface, comprising:

transmitting a data packet having a single identification header and configured under a first format from the PDA to the communication interface;

configuring the header associated wit the received data with a second format to produce a data packet having a plurality of headers for use by a computer server with the communication interface and transmitting the reconfigured data packet to the computer server;

processing the received data with the computer server;

transmitting the processed data to the communication interface in a data packet configured under the second format;

configuring the headers transmitted from the computer server to the communication interface that contains the processed data having the headers configured under the second format into a data packed configured under the first format by generating a reconfigured data packet derived from the data packet transmitted from the computer server to the communication interface and having a single identification header and associated data with the communication interface;

transmitting the reconfigured data packet to the PDA; and receiving and processing the processed data sent via the reconfigured data packet that has the reconfigured header by and with the PDA.

13. A method of facilitating communication between a personal data assistant (PDA) and a computer server via a communication interface, comprising:

receiving a data packet having a header configured under a first protocol, including a single identification header and related data, from a PDA to the communication interface;

configuring the header of the received data packet configured under the first protocol with the communication interface to produce a data packet configured under a second protocol having a plurality of headers by generating a plurality of identification headers that conforms with the second protocol arid transmitting the data packet configured under the second protocol to the computer server;

receiving processed data from the computer server in a data packet configured under the second protocol and having a plurality of headers;

configuring the processed data by reconfiguring the data packet received from the computer server to another data packet configured under the first protocol using the communication interface; and transmitting the reconfigured data packet having the processed data to the FDA.

14. For use in a communication interface for communication between a personal data assistant (PDA) and the communication interface, the communication interface being configured to communicate with other devices via the internet and being further configured to facilitate data communication between the PDA and other devices, a computer readable medium having stored thereon a plurality of sequences of instructions, said sequences of instructions including instructions that, when executed by a processor, cause said processor to perform the steps of:

receiving from a PDA a data packet having a single header configured under a first format with the communication interface, where the data packet received includes a single data identification (ID) header and associated data;

re-configuring the received data packet under a second format with the communication interface to produce a data packet that includes a multiple headers; and transmitting the re-configured data packet to a destination device.

15. A computer readable medium according to claim 14, wherein the step of receiving the data packet further includes receiving a data packet having a header containing data information including the intended destination of the data packet and the size of the data packet, and wherein the reconfiguring of the received data packet includes generating a TCP header and an IP header for transmission of the reconfigured packet to a destination.

16. A computer readable medium according to claim 14, wherein the step of re-configuring the data packet further includes the steps of:

separating the header information from the single header and associated data sent together in the data packet;

generating a new header under a second format; and generating a new data packet having a newly configured header and the data received in the original data packet.

17. A computer readable medium according to claim 16, wherein the step of generating a new header under the second format further includes the steps of: generating at least one header from the group including a TCP header and an IP header.

18. A computer readable medium according to claim 16, wherein the step of generating a new header under the second format further includes the steps of generating a new packet under a TCP/IP protocol.

19. A computer readable medium according to claim 14, wherein the step of configuring the header further includes the steps of:

separating the header information from the data sent in the data packet; and generating a newly configured data packet from the header information and the data received in the original data packet.

20. A computer readable medium according to claim 19, wherein the step of generating a newly configured data packet includes generating a new data packet with a new header configured under the second format.

21. A computer readable medium according to claim 14, further comprising:

receiving another data packet configured under the second format at the communications interface;

configuring a header for a new packet according to the first format having a single header from the second format having multiple headers; and transmitting the second reconfigured packet from the communications interface to the PDA.

22. A computer readable medium according to claim 21, wherein the step of configuring a header for a new data packet according to the first format includes reconfiguring payload data sent with the second reconfigured packet.

23. For use in a communication interface for communication between a personal data assistant (PDA) and the communication interface, the communication interface being configured to communicate with other devices via the internet and being further configured to facilitate data communication between the PDA and other devices, a computer readable medium having stared thereon a plurality of sequences of instructions, said sequences of instructions including instructions that, when executed by a processor, cause said processor to perform the steps of:

receiving from a PDA a data packet having a header configured under a first format with the communication interface, where the data packet received includes a data identification (ID) header and associated data;

re-configuring the received data packet under a second format with the communication interface to produce a data packet that includes a TCP header and an IP header;

transmitting the re-configured data packet to a destination device, receiving another data packet configured under the second format at the communications interface;

configuring a header for a new packet according to the first format having a single identification header and related data from the second format; and transmitting the second reconfigured packet from the communications interface to the PDA;

wherein configuring the header of the data packet from the second format to the first format includes reconfiguring the first data packet from a data packet having a plurality of headers configured under the TCP/IP protocol to a data packet having a single header configured under the OBEX protocol.

24. A communication interface configured to exchange digital data packets having communication headers with a computer server, wherein the received data packets are configured under a first format having a single identification header and associated data, with a PDA and to exchange digital data packets configured under a second format having multiple headers to aid in transmitting a reconfigured data packet to a destination device, comprising:

a parser configured to separate the header information from other information included within the data packet;

a packet convener configured to convert the data packet transmitted from the PDA under the first format having a single header and associated data to the second format having a plurality of headers, the packet converter including a data converter configured to configure data from one format to another format and a header generator configured to generate a header configured under the first header format;

a data packet generator configured to generate a second data packet having a plurality of headers using the header information and other information included in the original data packet sent by the PDA; and a data transmitter configured to transmit data to a destination device.

25. A communication interface according to claim 24, wherein the packet converter is configured convert a data packet sent by a PDA, wherein the data packet includes a single header and data payload, to a second data packet configured under the second format and having a plurality of headers.

26. A communication interface according to claim 25, wherein the packet convener is configured to reformat the first data packet according to the second format and wherein the second format includes a TCP header, an IP header and a PPP header that are configured under the second format.

27. A communication interface according to claim 25, wherein the packet converter is configured to reformat the first data packet according to the second format, wherein the second format includes a plurality of headers that are configured under the second format and wherein the second format further includes a data payload that is also reformatted under the second format.

28. A communication interface according to claim 24, wherein the packet converter is configured convert a data packet sent by a second device communicating with the communication interface, wherein the data packet includes a header and data payload, to a third data packet configured under the first format.

29. A communication interface according to claim 28, wherein the packet convener is configured to reformat the second data packet according to the first format and wherein the first format includes a header that is configured under the first format.

30. A communication interface according to claim 28, wherein the packet convener is configured to reformat the second data packet according to the first format, wherein the first format includes a header that is configured under the first format and wherein the first format further includes a data payload that is also reformatted under the first format.

* * * * *